US011072433B2

(12) United States Patent
Gaches et al.

(10) Patent No.: US 11,072,433 B2
(45) Date of Patent: Jul. 27, 2021

(54) AIRCRAFT COWL LOCKING SYSTEM

(71) Applicant: Airbus Operations (S.A.S.), Toulouse (FR)

(72) Inventors: Thierry Gaches, Castelnau D'estretefonds (FR); Mathieu Kaleta, Toulouse (FR); Pascal Gougeon, Bouloc (FR); Lionel Czapla, Cornebarrieu (FR); Frédéric Piard, Tournefeuille (FR); Bastian Sabathier, Fonsorbes (FR); Lionel Sillieres, Samatan (FR)

(73) Assignee: Airbus Operations (S.A.S.), Toulouse (FR)

( * ) Notice: Subject to any disclaimer, the term of this patent is extended or adjusted under 35 U.S.C. 154(b) by 201 days.

(21) Appl. No.: 16/557,139

(22) Filed: Aug. 30, 2019

(65) Prior Publication Data

US 2020/0079516 A1 Mar. 12, 2020

(30) Foreign Application Priority Data

Sep. 12, 2018 (FR) ...................................... 1858163

(51) Int. Cl.
*B64D 29/06* (2006.01)
*B64D 29/08* (2006.01)

(52) U.S. Cl.
CPC ............. *B64D 29/06* (2013.01); *B64D 29/08* (2013.01)

(58) Field of Classification Search
CPC ....... B64D 29/06; B64D 29/08; E05C 19/145; E05B 53/005; E05B 63/14
See application file for complete search history.

(56) References Cited

U.S. PATENT DOCUMENTS 4,549,708 A 10/1985 Norris
9,677,306 B2 6/2017 DeFrance
(Continued)

FOREIGN PATENT DOCUMENTS

EP 1 927 711 A2 6/2008
EP 2 674 362 A1 12/2013
FR 2 920 170 A1 2/2009

OTHER PUBLICATIONS

French Search Report for Application No. 1858163 dated May 29, 2019.

*Primary Examiner* — Assres H Woldemaryam
(74) *Attorney, Agent, or Firm* — Jenkins, Wilson, Taylor & Hunt, P.A.

(57) ABSTRACT

A locking system for locking a cowl to a fixed structure including first and second parts, the first part including a first hook moveable on the cowl and a first shaft fixed to the fixed structure in which the first hook is moveable between locked and unlocked positions, in which the second part includes a handle actuateable between closed and open positions, a second hook and a second shaft fixed to the fixed structure or to another cowl symmetric with the cowl, in which the second hook is moveable between locked and unlocked positions and in which the second hook is mounted where passage of the handle from the closed to open positions causes the second hook to pass from the locked into the unlocked position and vice versa, and in which the locking system also includes a transmission system to move the first hook from the locked into the unlocked position when the handle passes from the closed into the open position, and vice versa.

8 Claims, 4 Drawing Sheets

(56) References Cited

U.S. PATENT DOCUMENTS

| | | | |
|---|---|---|---|
| 10,760,304 B2* | 9/2020 | Do | E05B 63/06 |
| 2004/0104583 A1* | 6/2004 | Porte | B64D 45/0005 |
| | | | 292/229 |
| 2005/0024815 A1 | 2/2005 | Pratt | |
| 2008/0277529 A1* | 11/2008 | Marche | B64D 29/08 |
| | | | 244/129.4 |
| 2010/0171319 A1* | 7/2010 | Joret | B64D 29/06 |
| | | | 292/96 |
| 2011/0113837 A1 | 5/2011 | Soulier et al. | |
| 2013/0234447 A1* | 9/2013 | Gonidec | E05B 83/243 |
| | | | 292/129 |
| 2015/0184543 A1* | 7/2015 | Fabre | E05B 11/02 |
| | | | 244/54 |
| 2015/0184544 A1* | 7/2015 | Fabre | B64D 29/06 |
| | | | 244/54 |
| 2015/0274308 A1* | 10/2015 | Renault | E05C 19/145 |
| | | | 415/214.1 |
| 2016/0032779 A1* | 2/2016 | Sawyers-Abbott | F02C 3/04 |
| | | | 60/805 |
| 2016/0347465 A1* | 12/2016 | Mellor | B64D 29/06 |
| 2017/0036772 A1* | 2/2017 | Faugeras | B64F 5/60 |

* cited by examiner

AIRCRAFT COWL LOCKING SYSTEM

CROSS-REFERENCE TO RELATED APPLICATION

This application claims the benefit of and priority to French patent application number 18 58163 filed on Sep. 12, 2018, the entire disclosure of which is incorporated by reference herein.

TECHNICAL FIELD

The disclosure herein relates to a system for locking a cowl, to a nacelle of an aircraft engine comprising such a locking system, and to an aircraft comprising such a nacelle.

BACKGROUND

A nacelle surrounds the aircraft engine and has cowls which form an aerodynamic surface. During maintenance operations, it is necessary to open or remove the cowls in order to allow a technician to work on the elements underneath the cowls.

Each cowl is mounted articulated on several hinges positioned at the top part and is locked by a lock at the bottom part. Each hinge consists in a gooseneck articulation which allows the cowl to stand clear when opened, and thereafter makes the technician's intervention easier.

In general, there are several goosenecks distributed along the length of the cowl in order to react the cowl operating loads.

The bulk and resultant mass of these gooseneck hinges are dependent on the distance between the exterior shape of the cowl and the axis of rotation thereof. The greater this distance, the more bulky and heavy the gooseneck is. On cowls that have more than two goosenecks, with a conventional design of articulation, the goosenecks need to be aligned, which means moving the axis of articulation away from the exterior shape of the cowl on one or more of the goosenecks. In such instances, the bulkiness of the goosenecks, spaced away from the exterior shape of the cowl, increases, to the detriment of the mass and other components.

SUMMARY

An object of the disclosure herein is a locking system that makes it possible to dispense with a certain number of goosenecks allowing the goosenecks to be kept at those positions where they are closest to the aerodynamic shape, thus improving the bulk and the carried mass.

To this end, the disclosure herein proposes a locking system for locking a cowl to a fixed structure in which the locking system comprises a first part and a second part, in which the first part comprises a first hook mounted with the ability to move translationally on the cowl and a first shaft fixed to the fixed structure in which the first hook is able to move between, alternately, a locked position in which the first hook sits snugly around the first shaft and an unlocked position in which the first hook does not sit snugly around the first shaft, in which the second part comprises a handle mounted articulated on the cowl and able to be actuated between a closed position and an open position, a second hook mounted articulated on the handle and a second shaft fixed to the fixed structure or to another cowl symmetric with the cowl, in which the second hook is able to move between, alternately, a locked position in which the second hook sits snugly around the second shaft and an unlocked position in which the second hook does not sit snugly around the second shaft and in which the second hook is mounted on the handle in such a way that the passage of the handle from the closed position to the open position causes the second hook to pass from the locked position into the unlocked position and vice versa, and in which the locking system also comprises a transmission system which is configured to move the first hook from the locked position into the unlocked position when the handle passes from the closed position into the open position, and vice versa.

Such a locking system makes it possible to dispense with a certain number of hinges and to optimize the remaining ones by comparison with the prior art.

Advantageously, the opening of the second hook faces upwards.

Advantageously, the handle is mounted articulated on the cowl about a main axis of rotation, the second hook is mounted articulated on the handle about a secondary axis of rotation which is parallel to and offset from the main axis of rotation, and the transmission system comprises a cable which is guided along the cowl between the first part and the second part.

According to an embodiment, the transmission system comprises a bellcrank a first end of which is mounted articulated on the cowl about an axis of pivoting parallel to the main axis of rotation, a link mounted articulated between the handle and the bellcrank between the first end and a second end of the bellcrank, and the cable is fixed to the second end of the bellcrank.

According to an embodiment, the transmission system comprises a pin mounted with the ability to slide with respect to the cowl, a bellcrank which has a first end and a second end and which is mounted articulated between the first end and the second end on the cowl about an axis of pivoting parallel to the main axis of rotation, in which the cable is fixed to the second end of the bellcrank, a compression spring which is fixed to the cowl and which pushes against the second end of the bellcrank so as to pull on the cable, a transmission cable which is fixed between the pin and the first end of the bellcrank via a direction-change pulley, and the handle has a cam which is shaped in such a way as to push the pin away from the pulley when it is in the closed position and allow the pin to move closer to the pulley when it is in the open position.

Advantageously, the first part comprises a first tension spring fixed between the cowl and the first hook to urge the first hook into the locked position, the first hook comprises a notch, the transmission system comprises a crank lever which has a first end and a second end and which is mounted articulated between the first end and the second end on the cowl about a lever axis in which the cable is fixed to the first end of the crank lever, the second end of the crank lever is designed to come to bear against the first hook as the handle passes from the closed position towards the open position, the locking system comprises an immobilizing system which has a first link mounted articulated by one end to the first end of the crank lever, a second link mounted articulated by a first end to the cowl, and a second tension spring, the second end of the first link and the second end of the second link are mounted articulated to one another at a common articulation, the common articulation is able to move between a stopped position in which the common articulation is housed in the notch and a free position in which the common articulation is not in the notch, and the second tension spring is fixed between the cowl and the common articulation and urges the common articulation into the stopped position.

Advantageously, the first shaft is mounted with the ability to move translationally on the fixed structure, the first shaft is urged by two compression springs positioned on each side of the first shaft, and the first shaft has a central section that is compared to its ends.

The subject matter herein also discloses a nacelle of an engine of an aircraft comprising a fixed structure, a cowl mounted articulated on the fixed structure, and a locking system according to one of the preceding alternative forms, in which the first part is in the top part of the cowl and in which the second part is in the bottom part of the cowl.

The subject matter herein also discloses an aircraft comprising at least one nacelle according to the preceding alternative form.

BRIEF DESCRIPTION OF THE DRAWINGS

The abovementioned features of the disclosure herein, together with others, will become more clearly apparent from reading the following description of one exemplary embodiment, the description being given in connection with the attached drawings, among which.

DETAILED DESCRIPTION

Figure 1:
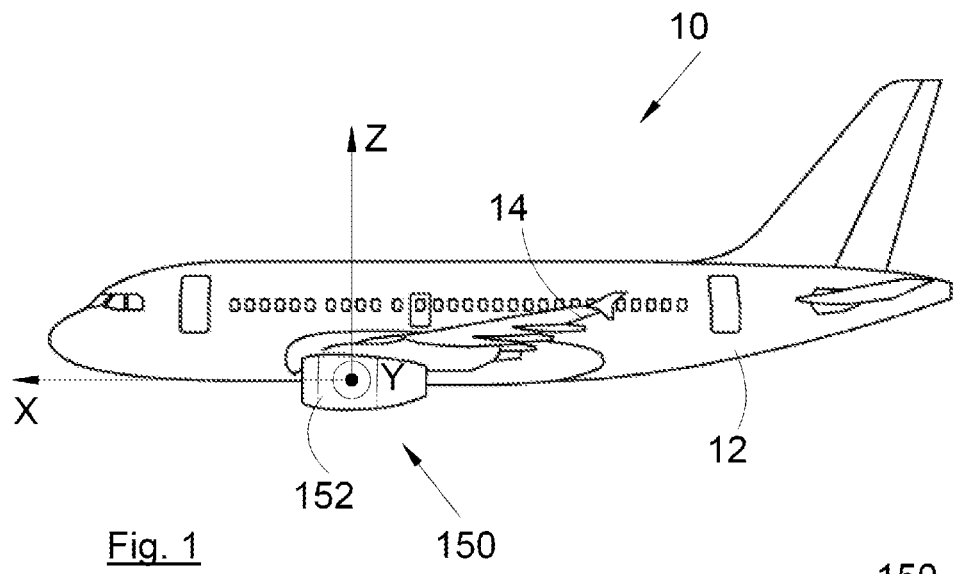
FIG. 1 is a side view of an aircraft comprising a nacelle according to the disclosure herein.

In the description which follows, terms relating to a position are considered with reference to a nacelle in its position of use on an aircraft, namely as depicted in FIG. 1.

In the description which will follow, by convention, the direction X corresponds to the longitudinal direction of the turbomachine, this direction being parallel to the longitudinal axis of this turbomachine. Furthermore, the direction Y corresponds to the direction oriented transversely with respect to the turbomachine and the direction Z corresponds to the vertical or heightwise direction, these three directions X, Y, Z being mutually orthogonal.

FIG. 1 shows an aircraft 10 which comprises a fuselage 12 on each side of which there is attached a wing 14 under each of which wings is fixed at least one engine, particularly a turbomachine, surrounded by a nacelle 150.

The nacelle 150 comprises a cowl 152 which is mounted articulated on a fixed structure of the nacelle 150. The cowl 152 has, at the top, hinges in the form of goosenecks the number of which is reduced in comparison with the prior art and in which at least one gooseneck is replaced by a locking system according to the disclosure herein. Conventionally, the nacelle 150 comprises a symmetric cowl which is the symmetric counterpart of the cowl 152 with respect to a mid plane XZ of the nacelle 150.

Reducing the number of goosenecks allows a reduction in weight, together with a reduction in bulk.

Figure 2:
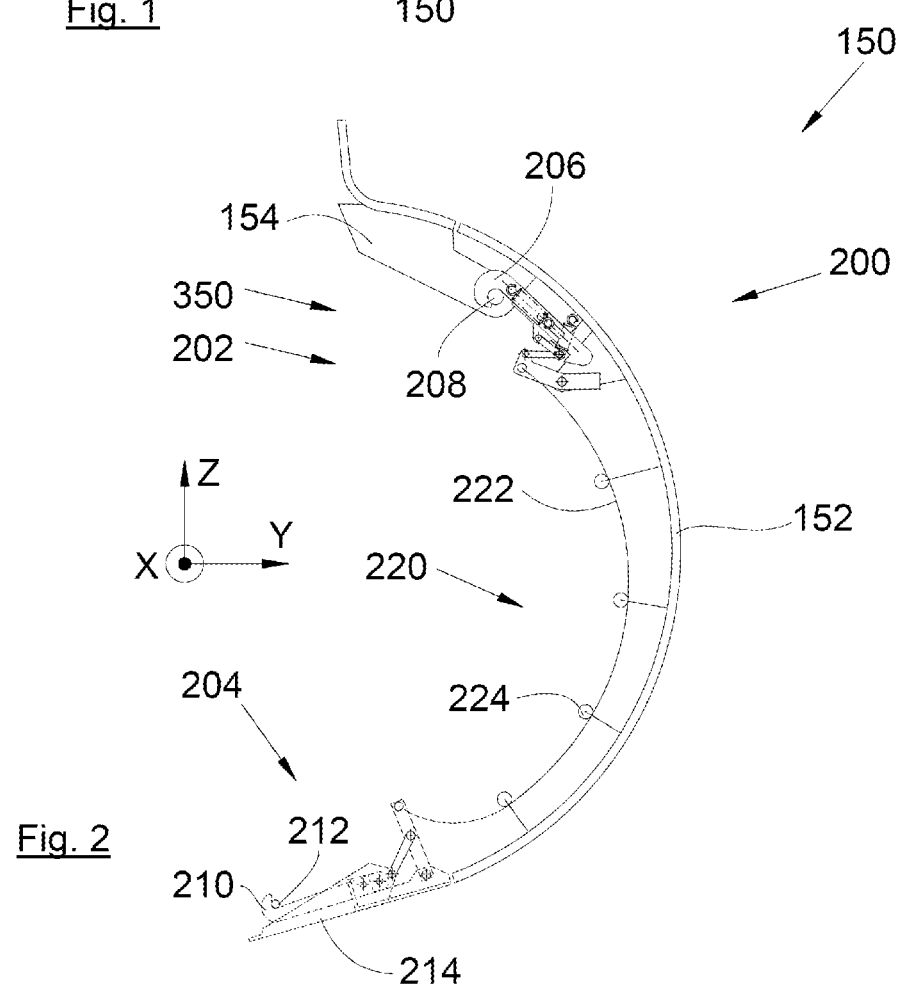
FIG. 2 is a front view of a nacelle equipped with a locking system according to a first embodiment of the disclosure herein and in the closed position.

FIG. 2 shows a first embodiment of the locking system 200 which comprises a first part 202 at the top of the cowl 152 and a second part 204 in the bottom part of the cowl 152. The locking system 200 is more particularly described in the context of a cowl 152 of a nacelle 150 of an aircraft 10, but applies in exactly the same way to any type of cowl 152 mounted on a fixed structure 154.

The first part 202 comprises a first hook 206 mounted with the ability to move translationally on the cowl 152 and a first shaft 208 fixed to the fixed structure 154 of the nacelle 150 in which the first hook 206 is able to move between, alternately, a locked position in which the first hook 206 sits snugly around the first shaft 208 to provide locking and an unlocked position in which the first hook 206 does not sit snugly around the first shaft 208, to release the first hook 206.

The second part 204 comprises a handle 214 mounted articulated on the cowl 152 and able to be actuated by a technician between a closed position and an open position.

The second part 204 also comprises a second hook 210 mounted articulated on the handle 214 and a second shaft 212 fixed to the fixed structure 154 of the nacelle 150, in which the second hook 210 is able to move between, alternately, a locked position in which the second hook 210 sits snugly around the second shaft 212 to provide locking and an unlocked position in which the second hook 210 does not sit snugly around the second shaft 212, to release the second hook 210.

The second shaft 212 may also be fixed to the cowl symmetric with the cowl 152.

The second hook 210 is mounted on the handle 214 in such a way that the passage of the handle 214 from the closed position to the open position causes the second hook 210 to pass from the locked position into the unlocked position and vice versa.

The locking system 200 also comprises a transmission system 220, 620 which is configured to move the first hook 206 from the locked position into the unlocked position when the handle 214 passes from the closed position into the open position, and vice versa.

Thus, actuation of the handle 214 will release the first hook 206 and the second hook 210, making it possible to release the cowl 152 which will be able to pivot about its hinges.

The opening of the second hook 210 faces upwards, which means to say that the second hook 210 sits snugly around the second shaft 212 from beneath. The second hook 212 is therefore subjected to the effects of gravity and hangs down when not engaged with the second shaft 212. This arrangement allows a quick check of whether the second hook 210 is correctly engaged.

Figure 5:
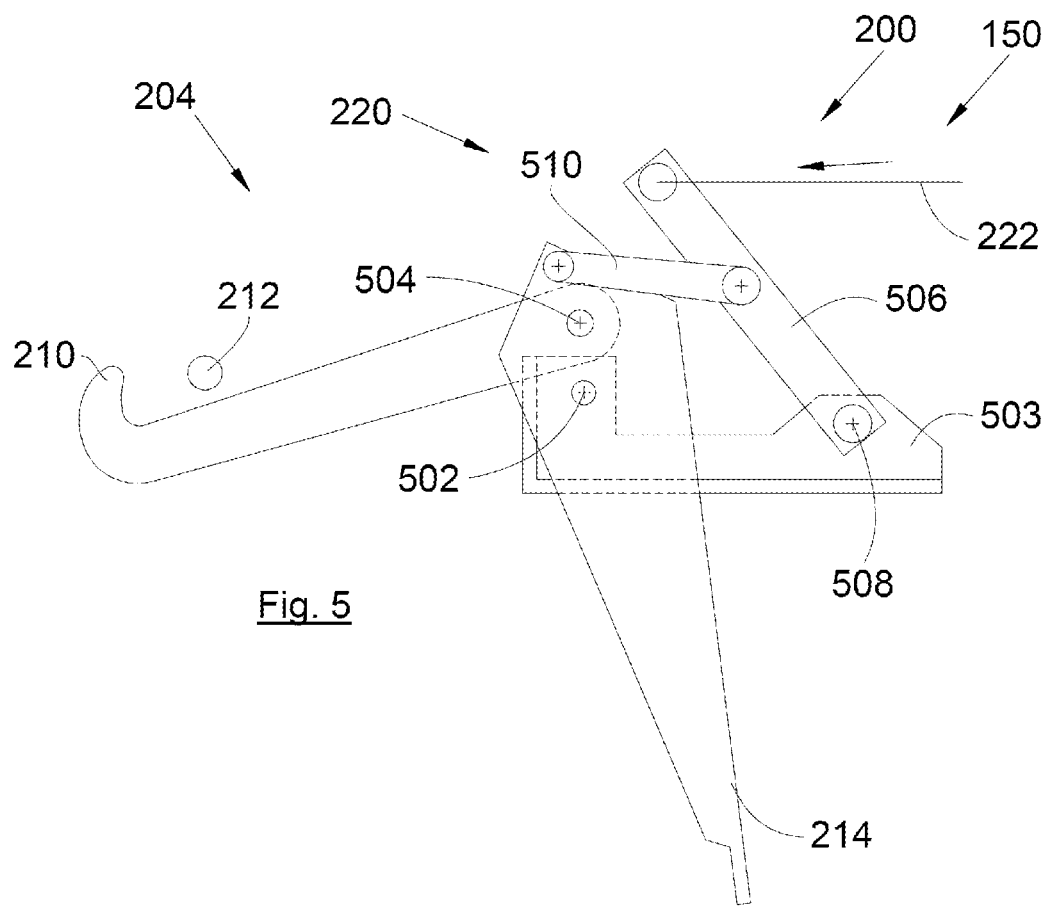
FIG. 5 shows a second part of the locking system of FIG. 2 in an open position.
Figure 6:
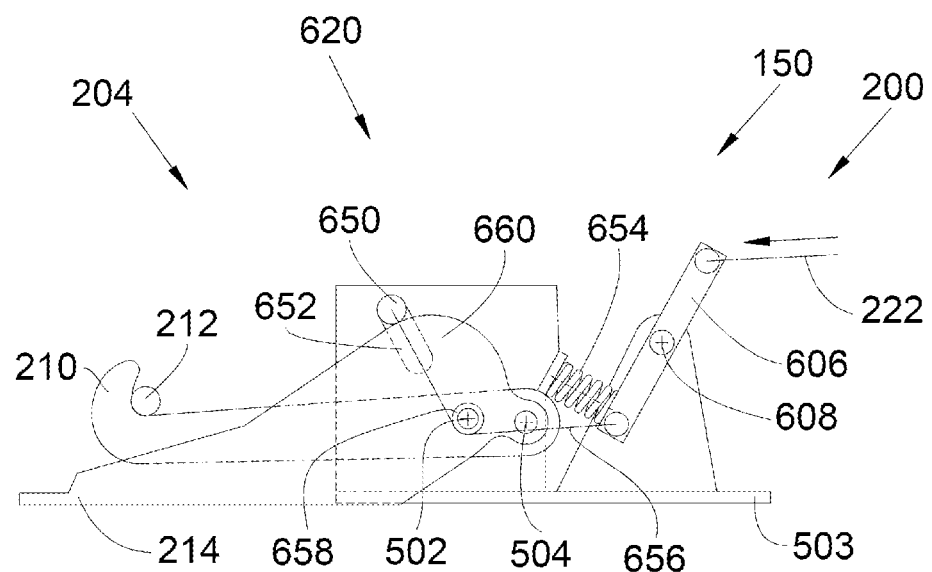
FIG. 6 shows the second part of the locking system according to a second embodiment of the disclosure herein.

FIGS. 5 and 6 show various embodiments of the transmission system 220, 620. FIG. 5 corresponds to the first embodiment of FIG. 2. FIG. 6 corresponds to a second embodiment.

In each of the embodiments, the handle 214 is mounted articulated on a chassis 503 of the cowl 152 about a main axis of rotation 502 which in this instance is parallel to the longitudinal direction X.

The second hook 210 is mounted articulated on the handle 214 about a secondary axis of rotation 504 which is parallel to and offset from the main axis of rotation 502. Thus, through a lever effect, pivoting the handle 214 will disengage the second hook 210 from the second shaft 212 or, conversely, engage the second hook 210 against the second shaft 212.

In each embodiment, the transmission system 220, 620 comprises a cable 222 which is guided along the cowl 152 between the first part 202 and the second part 204. Here, the guidance of the cable 222 is afforded by a succession of rollers 224 secured to the cowl 152.

Depending on whether the cable 222 works in tension or in compression, the cable 222 will preferably be a flexible cable or a sheathed cable.

In the case of the first embodiment (FIGS. 2, 3 and 5), the transmission system 220 also comprises a bellcrank 506 a first end of which is mounted articulated on the chassis 503 about an axis of pivoting 508 parallel to the main axis of rotation 502. The cable 222 is fixed to a second end of the bellcrank 506.

The transmission system 220 also comprises a link 510 mounted articulated between the handle 214 and the bellcrank 506 between the first end and the second end.

Thus, the pivoting of the handle 214 from the closed position to the open position will lead to tension on the link 510 which will cause the bellcrank 506 to pivot about the axis of pivoting 508 and pull on the cable 222. Pivoting the handle 214 in the opposite direction will have the opposite effect.

In the case of the second embodiment (FIG. 6), the transmission system 620 also comprises a pin 650 mounted with the ability to slide with respect to the cowl 152, in this case in a slot 652 of the chassis 503.

The transmission system 620 also comprises a bellcrank 606 which has a first end and a second end and which is mounted articulated between the first end and the second end on the chassis 503 about an axis of pivoting 608 parallel to the main axis of rotation 502. The cable 222 is fixed to the second end of the bellcrank 606.

The transmission system 620 also comprises a compression spring 654 which is fixed to the chassis 503 and which pushes against the first end of the bellcrank 606 so as to pull on the cable 222.

The transmission system 620 also comprises a transmission cable 656 which is fixed between the pin 650 and the first end of the bellcrank 606 through a pulley 658 which provides a change in direction of the transmission cable 656. The pulley 658 here is coaxial with the main axis of rotation 502.

The handle 214 has a cam 660 which is shaped in such a way as to push the pin 650 away from the pulley 658 when it is in the closed position and allow the pin 650 to move closer to the pulley 658 when it is in the open position.

Thus, the pivoting of the handle 214 from the closed position to the open position will cause the cam 660 to move, which will leave the pin 650 free to move towards the pulley 658 under the effect of the compression spring 654 which pushes the bellcrank 606 back, and therefore tension the cable 222.

Conversely, pivoting the handle 214 from the open position to the closed position will cause the cam 660 to rotate which will tension the transmission cable 656 and pull on the first end of the bellcrank 606 and compress the compression spring 654, relaxing the cable 222.

Figure 3:
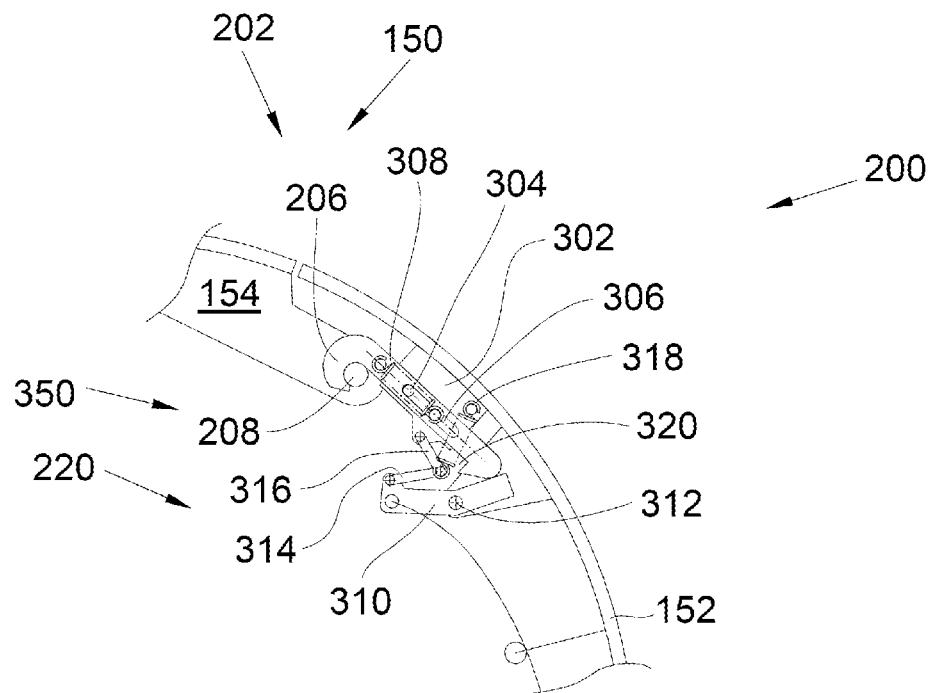
FIG. 3 and FIG. 4 show a first part of the locking system of FIG. 2 in two different positions.
Figure 4:
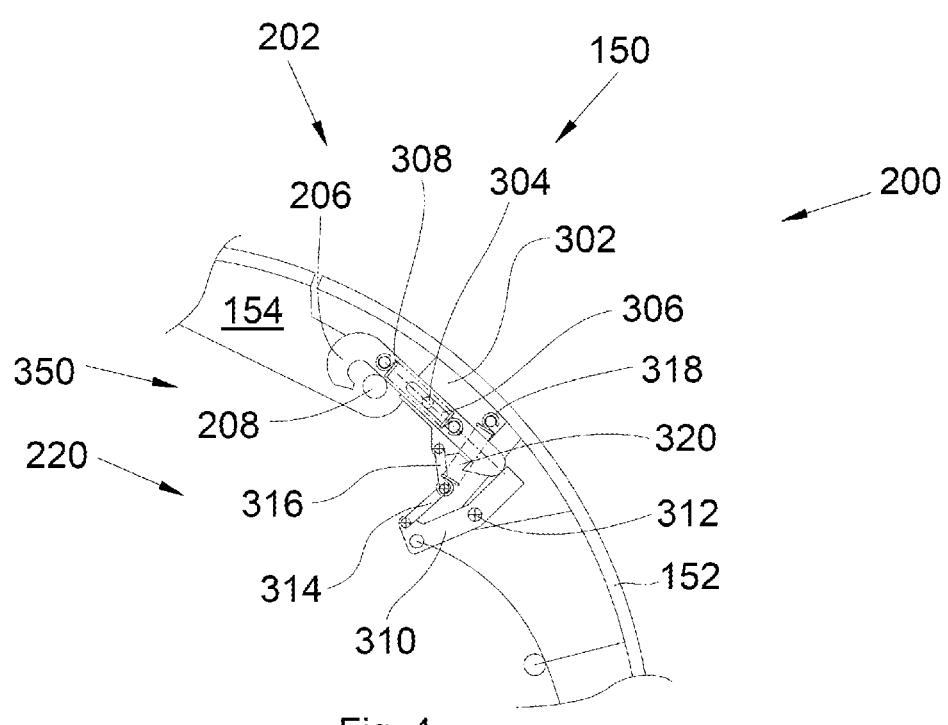

FIGS. 2 through 4 show the first part 202 in different positions. In FIG. 2, the first hook 206 is in the locked position; in FIG. 4, the first hook 206 is in the unlocked position; and in FIG. 3, the first hook 206 is in an intermediate position. The first part 202 described below may be used in both of the embodiments described above.

The first hook 206 is mounted with the ability to move translationally on a shoe 302 of the cowl 152. Guidance is achieved here by a slot 306 of the first hook 206 which slides on two pegs 304 secured to the shoe 302.

The first part 202 comprises a first tension spring 308 which is fixed between the shoe 302, in this instance a peg 304, and the first hook 206 and which urges the first hook 206 into the locked position.

The transmission system 220, 620 comprises a crank lever 310 which has a first end and a second end and which is mounted articulated between the first end and the second end on the shoe 302 about a lever axis 312 in which the cable 222 is fixed to the first end of the crank lever 310. In the embodiment of the disclosure herein depicted in FIGS. 2 to 4, the lever axis 312 is parallel to the main axis of rotation 502, but a different orientation is possible.

When the first hook 206 is in the locked position and the handle 214 is in the closed position, the second end of the crank lever 310 is distant from the first hook 206.

As explained later, the second end of the crank lever 310 is designed to come to bear against a part of the first hook 206 as the handle 214 passes from the closed position towards the open position so as to cause it to pass towards the unlocked position.

The locking system 200 also comprises an immobilizing system 350 which is designed to adopt a stopped position in which it stops the movement of the first hook 206 in the locked position and a free position in which it allows the first hook 206 to move from the locked position to the unlocked position.

The immobilizing system 350 comprises a first link 314 mounted articulated by one end to the first end of the crank lever 310.

The immobilizing system 350 also comprises a second link 316 mounted articulated by a first end to the shoe 302.

The second end of the first link 314 and the second end of the second link 316 are mounted articulated to one another at a common articulation.

The first hook 206 also comprises a notch 320.

The first link 314 and the second link 316 and therefore the common articulation are able to move between the stopped position in which the common articulation is housed in the notch 320 and stops the first hook 206 from moving from the locked position towards the unlocked position and the free position in which the common articulation is not in the notch 320 and allows the first hook 206 to move from the locked position towards the unlocked position.

The immobilizing system 350 also comprises a second tension spring 318 fixed between the shoe 302 and the common articulation and which urges the common articulation into the stopped position.

The stopped position makes it possible to prevent undesired movement of the first hook 206.

The way in which the first part 202 works is therefore as follows.

In FIG. 2, the first hook 206 is in the locked position because it is urged by the first tension spring 308 and the common articulation is in the stopped position because it is urged by the second tension spring 318. The second end of the crank lever 310 is some distance from the first hook 206.

When the handle 214 is actuated from the closed position towards the open position, the transmission system 220, 620 is actuated and the cable 222 is pulled. The crank lever 310 pivots to take up the space between its second end and the first hook 206. During this movement, the common articulation moves from the stopped position to the free position (FIG. 3).

The movement of the handle 214 continues and the cable 222 continues to be pulled. The second end of the crank lever 310 therefore comes into contact with the first hook 206 and pushes it to cause it to pass from the locked position into the unlocked position (FIG. 4) in which the first hook 206 comes free of the first shaft 208.

Conversely, when the handle 214 passes from the open position to the closed position, the cable 222 is relaxed and the first tension spring 308 and the second tension spring 318 return the first hook 206 and the common articulation to their initial positions.

Figure 7:
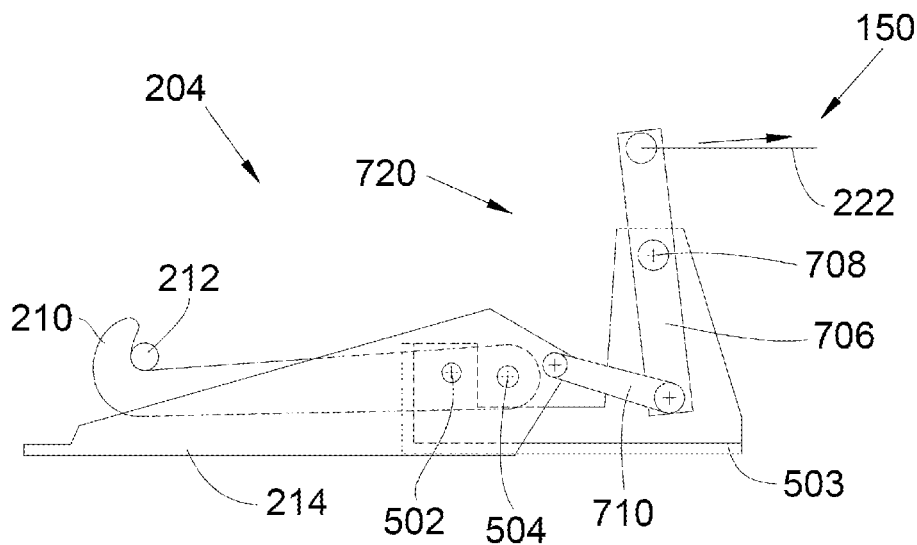
FIG. 7 shows the second part of the locking system according to another embodiment.

FIG. 7 corresponds to another embodiment and the transmission system 720 also comprises the cable 222, the handle 214 and the second hook 210 are mounted articulated in the same way.

The transmission system 720 also comprises a bellcrank 706 which has a first end and a second end and which is mounted articulated between the first end and the second end on the chassis 503 about an axis of pivoting 708 parallel to the main axis of rotation 502. The cable 222 is fixed to the second end of the bellcrank 706.

The transmission system 720 also comprises a link 710 mounted articulated between the handle 214 and the first end of the bellcrank 706.

Thus, the pivoting of the handle 214 will cause tension on the link 710 which will cause the bellcrank 706 to pivot about the axis of pivoting 708 and relax the cable 222 which, in this instance, operates in compression and is therefore a sheathed cable.

In order to allow the crank lever 310 to pivot in order to move the first hook 206, another bellcrank may be installed between the cable 222 and the crank lever 310.

Figure 8:
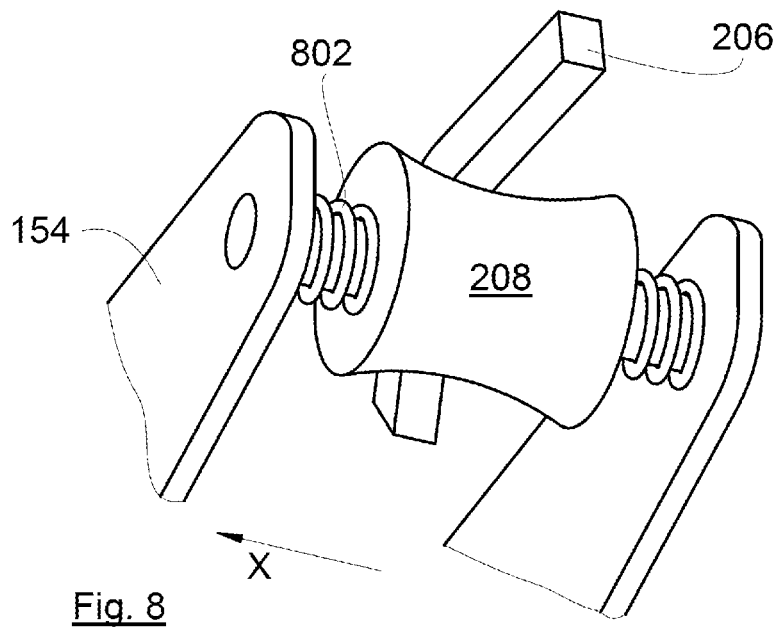
FIG. 8 is a perspective view of a detail of the fixing of a fastening shaft.

FIG. 8 shows an embodiment of the first shaft 208 which is mounted with the ability to move translationally on the fixed structure 154 parallel to the longitudinal direction X. The first shaft 208 is urged by two compression springs 802 arranged on each side of the first shaft 208. The first shaft 208 has a central section that is smaller compared with its ends.

Thus, when the first hook 206 sits snugly around the first shaft 208, because of the reduced central section, the first shaft will move translationally so that the first hook 206 positions itself at the central section. Such an arrangement makes it possible to ensure that the first hook 206 is correctly positioned even when certain elements have become deformed.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
 a nacelle,
 a cowl mounted articulated on a fixed structure,
 a locking system for locking a cowl to a fixed structure, the locking system comprising:
 a first part and a second part, the first part comprising a first hook for mounting and moveable translationally on the cowl and a first shaft to be fixed to the fixed structure in which the first hook is moveable between, alternately, a locked position in which the first hook sits snugly around the first shaft and an unlocked position in which the first hook does not sit snugly around the first shaft;
 the second part comprising a handle to be mounted articulated on the cowl about a first main axis of rotation and able to be actuated between a closed position and an open position, a second hook mounted articulated on the handle about a secondary axis of rotation which is parallel to, and offset from, the main axis of rotation, and a second shaft to be fixed to the fixed structure or to another cowl symmetric with the cowl, in which the second hook is able to move between, alternately, a locked position in which the second hook sits snugly around the second shaft and an unlocked position in which the second hook does not sit snugly around the second shaft and in which the second hook is mounted on the handle such that passage of the handle from the closed position to the open position causes the second hook to pass from the locked position into the unlocked position and vice versa;
 a transmission system configured to move the first hook from the locked position into the unlocked position when the handle passes from the closed position into the open position, and vice versa, in which the transmission system comprises a cable to be guided along the cowl between the first part and the second part; and
 the transmission system comprising a bellcrank a first end of which is configured to be mounted articulated on the cowl about an axis of pivoting parallel to the main axis of rotation, a mounted articulated between the handle and the bellcrank between the first end and a second end of the bellcrank, and wherein the cable is fixed to the second end of the bellcrank.

2. The aircraft according to claim 1, wherein the first part comprises a first tension spring to be fixed between the cowl and the first hook to urge the first hook into the locked position, wherein the first hook comprises a notch, wherein the transmission system comprises a crank lever which has a first end and a second end and to be mounted articulated between the first end and the second end on the cowl about a lever axis in which the cable is fixed to the first end of the crank lever, wherein the second end of the crank lever is configured to come to hear against the first hook as the handle passes from the closed position towards the open position, wherein the locking system comprises an immobilizing system which has a first link mounted articulated by one end to the first end of the crank lever, a second link to be mounted articulated by a first end to the cowl, and a second tension spring, wherein the second end of the first link and the second end of the second link are mounted articulated to one another at a common articulation, wherein the common articulation is moveable between a stopped position in which the common articulation is housed in the notch and a free position in which the common articulation is not in the notch, and wherein the second tension spring is to be fixed between the cowl and the common articulation and urges the common articulation into the stopped position.

3. The aircraft according to claim 1, wherein the first shaft is to be mounted with the ability to move translationally on the fixed structure, wherein the first shall is urged by two compression springs positioned on each side of the first shaft, and wherein the first shaft has a central section that is smaller compared with its ends.

4. The aircraft according to claim 1, in which the first part is in a top part of the cowl and in which the second part is in a bottom part of the cowl.

5. An aircraft comprising:
a nacelle,
a cowl mounted articulated on a fixed structure,
a locking system for locking a cowl to a fixed structure, the locking system comprising:
a first part and a second part;
the first part comprising a first hook for mounting with and moveable translationally on the cowl and a first shaft to be fixed to the fixed structure in which the first hook is moveable between, alternately, a locked position in which the first hook sits snugly around the first shaft and an unlocked position in which the first hook does not sit snugly around the first shaft;
the second part comprising a handle to be mounted articulated on the cowl about a first main axis of rotation and able to be actuated between a closed position and an open position, a second hook mounted articulated on the handle about a secondary axis of rotation which is parallel to, and offset from, the main axis of rotation, and a second shaft to be fixed to the fixed structure or to another cowl symmetric with the cowl, in which the second hook is able to move between, alternately, a locked position in which the second hook fits snugly around the second shaft and an unlocked position in which the second hook does not fit snugly around the second shaft and in which the second hook is mounted on the handle such that the passage of the handle from the closed position to the open position causes the second hook to pass from the locked position into the unlocked position and vice versa;
the locking system comprising a transmission system configured to move the first hook from the locked position into the unlocked position when the handle passes from the closed position into the open position, and vice versa, in which the transmission system comprises a cable to be guided along the cowl between the first part and the second part; and
the transmission system comprising a pin to be mounted with an ability to slide with respect to the cowl, a bellcrank which has a first end and a second end and which is mounted articulated between the first end and the second end on the cowl about an axis of pivoting parallel to the main axis of rotation, in which the cable is fixed to the second end of the bellcrank, a compression spring to be fixed to the cowl and which pushes against the second end of the bellcrank so as to pull on the cable, a transmission cable fixed between the pin and the first end of the bellcrank via a direction-change pulley and wherein the handle has a cam shaped to push the pin away from the pulley when it is in the closed position and allow the pin to move closer to the pulley when it is in the open position.

6. The aircraft according to claim 5, wherein the first part comprises a first tension spring to be fixed between the cowl and the first hook to urge the first hook into the locked position, wherein the first hook comprises a notch, wherein the transmission system comprises a crank lever which has a first end and a second end and to be mounted articulated between the first end and the second end on the cowl about a lever axis in which the cable is fixed to the first end of the crank lever, wherein the second end of the crank lever is configured to come to bear against the first hook as the handle passes from the closed position towards the open position, wherein the locking system comprises an immobilizing system which has a first link mounted articulated by one end to the first end of the crank lever, a second link to be mounted articulated by a first end to the cowl, and a second tension spring, wherein the second end of the first link and the second end of the second link are mounted articulated to one another at a common articulation, wherein the common articulation is moveable between a stopped position in which the common articulation is housed in the notch and a free position in which the common articulation is not in the notch, and wherein the second tension spring is to be fixed between the cowl and the common articulation and urges the common articulation into the stopped position.

7. The aircraft according to claim 5, wherein the first shaft is to be mounted with the ability to move translationally on the fixed structure, wherein the first shaft is urged by two compression springs positioned on each side of the first shaft, and wherein the first shaft has a central section that is smaller compared with its ends.

8. The aircraft according to claim 5, in which the first part is in a top part of the cowl and in which the second part is in a bottom part of the cowl.

* * * * *